(12) United States Patent
Ribon

(10) Patent No.: US 12,352,380 B2
(45) Date of Patent: Jul. 8, 2025

(54) CONNECTION DEVICE BENT AT MULTIPLE ANGLES

(71) Applicant: Benoit Ribon, La Londe les Maures (FR)

(72) Inventor: Benoit Ribon, La Londe les Maures (FR)

(\*) Notice: Subject to any disclaimer, the term of this patent is extended or adjusted under 35 U.S.C. 154(b) by 0 days.

(21) Appl. No.: 18/555,011

(22) PCT Filed: Apr. 22, 2022

(86) PCT No.: PCT/IB2022/053789
§ 371 (c)(1),
(2) Date: Oct. 12, 2023

(87) PCT Pub. No.: WO2022/229811
PCT Pub. Date: Nov. 3, 2022

(65) Prior Publication Data
US 2024/0191815 A1    Jun. 13, 2024

(30) Foreign Application Priority Data

Apr. 25, 2021  (FR) ........................ 2104274
Oct. 21, 2021  (FR) ........................ 2111225
Apr. 14, 2022  (FR) ........................ 2203473

(51) Int. Cl.
*F16L 9/22*     (2006.01)
*F16L 43/00*    (2006.01)

(52) U.S. Cl.
CPC ............ *F16L 9/22* (2013.01); *F16L 43/008* (2013.01); *F16L 2201/60* (2013.01)

(58) Field of Classification Search
CPC ....... F16L 9/22; F16L 43/008; F16L 2201/60; F16L 43/00
USPC .................................................... 285/179, 182
See application file for complete search history.

(56) References Cited

U.S. PATENT DOCUMENTS 2,155,080 A * 4/1939 Cornell, Jr. .................. 285/179
3,224,814 A * 12/1965 Fisher .......................... 285/179
3,247,581 A * 4/1966 Pellizzari ..................... 285/179
3,977,706 A * 8/1976 Schneider ............... F16L 43/00
                                                285/179

(Continued)

FOREIGN PATENT DOCUMENTS

DE       815740 C     10/1951
DE     3901618 A1      7/1990

(Continued)

OTHER PUBLICATIONS

WO-2017107786-A1—Machine Translation—English (Year: 2017).*

(Continued)

*Primary Examiner* — William S. Choi
(74) *Attorney, Agent, or Firm* — Reising Ethington P.C.

(57) ABSTRACT

A rigid connection device for conveying fluids or stream-like solid compounds, comprises at least one male or female end-piece (1) and a substantially cylindrical module B (3, 7) curved by up to 180°, characterized in that the module B can be cut down at a chosen angle of curvature, and the module B comprises graduations or ringed connecting elements at regular angular intervals for determining sections for transversely cutting it down to the chosen angle of curvature.

14 Claims, 8 Drawing Sheets

SECTION A-A

(56) References Cited

U.S. PATENT DOCUMENTS

| | | | |
|---|---|---|---|
| 3,979,809 A * | 9/1976 | Schneider | F16L 43/00 |
| | | | 285/179 |
| 4,653,777 A * | 3/1987 | Kawatsu | 285/179 |
| 5,473,815 A * | 12/1995 | Sonden | |
| 5,718,461 A * | 2/1998 | Esser | 285/179 |
| 5,775,736 A * | 7/1998 | Svetlik | 285/179 |
| 6,179,343 B1 * | 1/2001 | Byrnes | F16L 43/00 |
| | | | 285/184 |
| 8,793,850 B2 * | 8/2014 | Tubach | |
| 2010/0148488 A1 * | 6/2010 | Homola | F16L 43/00 |
| 2014/0020811 A1 * | 1/2014 | Wermelinger | F16L 43/008 |

FOREIGN PATENT DOCUMENTS

| | | |
|---|---|---|
| KR | 10-2013-0134406 A | 12/2013 |
| WO | 2015/196249 A1 | 12/2015 |
| WO | WO-2017107786 A1 * | 6/2017 |

OTHER PUBLICATIONS

DE 815740 C—Machine Translation—English (Year: 1951).*
International Search Report issued in International (PCT) Patent Application No. PCT/IB2022/053789 (Aug. 18, 2022).
English Translation of International Search Report issued in International (PCT) Patent Application No. PCT/IB2022/053789 (Aug. 18, 2022).
Written Opinion issued in International Search Report issued in International (PCT) Patent Application No. PCT/IB2022/053789 (Aug. 18, 2022).

\* cited by examiner

SECTION A-A

SECTION A-A

SECTION A-A

CONNECTION DEVICE BENT AT MULTIPLE ANGLES

CROSS-REFERENCE TO RELATED APPLICATIONS

This application is the national stage application of International Application No. PCT/IB2022/053789 filed Apr. 22, 2022 which designates the United States of America. This application also claims priority, under 35 U.S.C. § 119, to French Patent Application No. 2104274 filed Apr. 25, 2021, French Patent Application No. 2111225 filed Oct. 21, 2021 and French Patent Application No. 2203473 filed Apr. 14, 2022. The prior applications are herein incorporated by reference in their entirety.

TECHNICAL FIELD

The invention relates to the field of transport of fluids, liquids or gases, or wire-type solid material, particularly in the building and public works industry, more particularly for the creation and connection of networks. The invention relates more particularly to a connection device.

PRIOR ART

There are flexible multi-bend connection devices made of flexible material, in particular as described in patent application EP0913611 which discloses a connection device for plastic pipes comprising at least two sleeves intended to each be fitted onto one end of the pipes to be connected, and joined by at least one flexible intermediate part, but these devices are not suitable for all uses due to their deformable and non-rigid nature.

There are also multi-angle elbow type connection devices in the form of one, two, three or four elbow modules designed to be interlocked, making it possible to obtain four predetermined bending angles between 22 and 87° with male-female connections. However, it is not possible to tailor-fit such devices to geometric and network connection constraints.

SUMMARY OF THE INVENTION

The invention relates to a rigid connection device for the transport of fluids or wire-type solid material comprising at least one male or female end piece (1) and a substantially cylindrical module B (3 or 7) curved up to 180°, preferably up to 90°, wherein said module B may be cut by any means at a chosen angle of curvature and said module B comprises means for determining cross-sectional sections at regular angular intervals at said chosen angle of curvature, said module B being a portion of torus on which graduations (5) at regular angular interval create said cross-sectional sections at regular angular interval (module B1,3) or said module B comprising alternating cylindrical rings (8) separated in pairs by identical corrugated connecting elements (9) projecting in the longitudinal plane as an isosceles triangle, the outer edges of said connecting elements creating said cross-sectional sections at regular angular intervals (module B2,7).

Said regular angular interval may be between 1 and 20°, preferably between 2 and 15°, most preferably between 5 and 10°.

Said module B may include an alignment indicator (6), over the entire length of the module, intersecting perpendicularly the graduations or the outer edges of the cylindrical rings.

Said module B may be supplemented by a module C (10) comprising a first curved cylindrical sleeve (11) whose end piece, male or female, is slideable on module B to be fixed thereon by screwing, gluing, heating, interlocking or any other connection method, and a second cylindrical and fixed sleeve (12) adapted to connect to an opening or a network by means of a male or female end piece (13).

Said module C may include an alignment indicator (15).

Said module B, in its variant B2, may include a stop (14) at the base of each cylindrical ring.

The connection device according to the invention may comprise a module A comprising a sleeve (2), provided with a male or female end piece (1), adapted to connect to module B on one side and to an opening or any network on the other.

The material of the connection device according to the invention may be chosen from the following materials: polyvinyl chloride (PVC), polypropylene (PP), polyethylene (PE), polyvinylidene fluoride (PVDF), polyolefin, fiber, fiber cement, sandstone, concrete, zinc, steel, aluminum, copper, metal alloys, resins, used alone or in a mixture, preferably from polyvinyl chloride (PVC), polypropylene (PP), polyethylene (PE), fiber, fiber cement, sandstone, concrete, zinc, steel, aluminum, metal alloys, resins, the most preferable material being polyvinyl chloride (PVC).

The nominal outer diameter of said device may be between 10 and 2000 mm, preferably between 20 and 1000 mm, most preferably between 32 and 630 mm.

The invention also relates to the use of the connection device according to any of its variants for the transport of gases, liquids or solid elements.

LIST OF FIGURES

Figure 1:
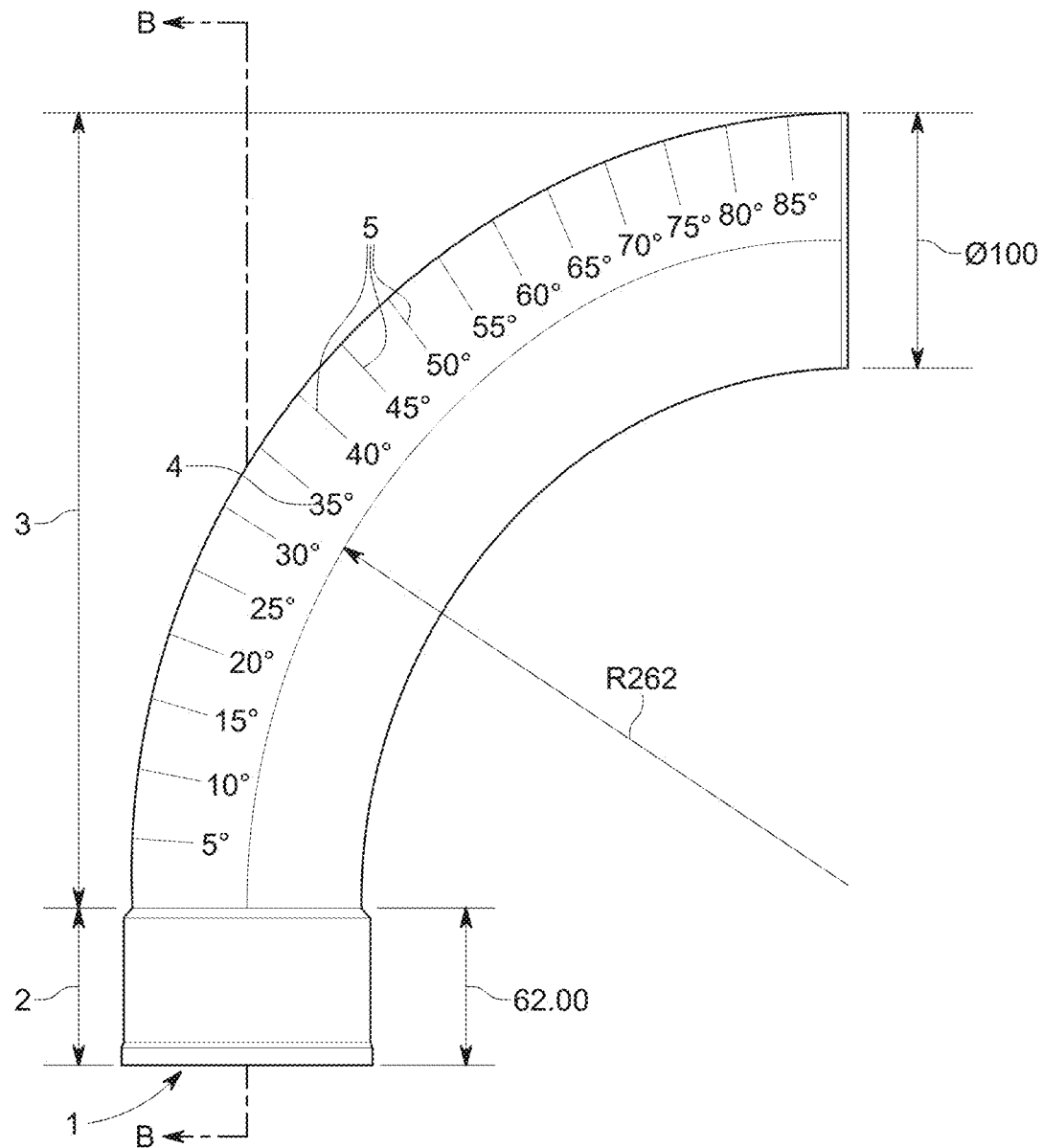
FIG. 1 represents a longitudinal view of the device according to the invention in an exemplary embodiment combining a curved module B1 and a module A with a female end piece.

Other characteristics and advantages of the device according to the invention will appear on reading the following description of non-limiting exemplary embodiments, with reference to the appended figures described below.

DESCRIPTION OF EMBODIMENTS

The invention relates to an improved connection device, also hereinafter referred to as a "multi-angle elbow", capable, in particular, of being connected to a line pipe and having the advantage of being able to be cut at regular angular intervals in order to form a cylindrical elbow curved at an angle chosen by the end user, preferably between 0 and 180°, most preferably between 0 and 90°.

The device according to the invention may comprise one or more hollow modules, intended to be connected with other pipe or transport elements or with each other by screwing, gluing, heating, interlocking or any other connection method, depending on the angle chosen by the user.

The device according to the invention may be available in any material, thickness, section or diameter known to a person skilled in the art.

The nominal outer diameter of the connection device according to the invention, also called a multi-angle elbow, may be adapted to the intended application.

Preferably, but not restrictively, in the building sector in particular, the nominal outer diameter of the connection device is between 10 and 2000 mm, more preferably between 20 and 1000 mm, even more preferably between 32 and 630 mm.

The material of the connection device according to the invention may be chosen from the following materials: polyvinyl chloride (PVC), polypropylene (PP), polyethylene (PE), polyvinylidene fluoride (PVDF), polyolefin, fiber, fiber cement, sandstone, concrete, zinc, steel, aluminum, copper, metal alloys, resins, used alone or in a mixture.

Preferably, the material of the connection device according to the invention may be chosen from polyvinyl chloride (PVC), polypropylene (PP), polyethylene (PE), fiber, fiber cement, sandstone, concrete, zinc, steel, aluminum, alloys metals or resins.

Most preferably, the material is polyvinyl chloride (PVC).

The different modules of the connection device according to the invention may be manufactured by any method known to a person skilled in the art, for example by injection, rotational molding, thermoforming or 3D printing.

Table 1 below describes non-limiting examples of the manufacture of the connection device according to the invention for three applications: a compact PVC connection device (between 32 and 200 mm), a multi-layer PVC connection device (between 110 and 1000 mm), a connection device for telecommunications type PVC tubes suitable for the passage of an optical fiber (between 28 and 100 mm). Table 1 presents different nominal outer diameters (in mm) for the three examples of connection devices according to the invention.

TABLE 1

|  | Compact PVC | Multi-layer PVC | Telecom PVC tubes Optical fiber |
|---|---|---|---|
| Nominal outer diameter in mm | 32 | 110 | 28 |
|  | 40 | 125 | 33 |
|  | 50 | 140 | 45 |
|  | 63 | 160 | 60 |
|  | 75 | 200 | 80 |
|  | 80 | 250 | 100 |
|  | 90 | 315 |  |
|  | 100 | 400 |  |
|  | 110 | 500 |  |
|  | 125 | 630 |  |
|  | 140 | 710 |  |
|  | 160 | 800 |  |
|  | 200 | 1000 |  |

The connection device comprises a curved module B with an angular gradation advantageously between 0 and 180°, preferably between 0 and 90°, substantially cylindrical, which may be cut at the angle chosen by the end user, optionally associated with one or two other modules A and C.

Modules A, B, or C may have a male or female end piece.

"The male end piece" designates an end piece with a diameter less than the diameter of the end piece to which it may be connected, by any means.

"The female end piece" designates an end piece with a diameter greater than the diameter of the end piece to which it may be connected, by any means.

"Nominal outer diameter" of the device shall be defined as the nominal outer diameter of the curved module B, excluding sleeves and end pieces.

Modules A, B and C are described below, with reference to FIGS. 1 to 7A-7C.

Module A

The optional Module A may be connected first to an opening or any pre-existing network (pipes, joints, gutters, vents, tubes or hoses, etc.). Module A includes a cylindrical sleeve (2), fitted with a male or female end piece (1), allowing it to be connected to the element located where it is to be installed. The sleeve (2) of module A is advantageously rectilinear and fixed, and may be manufactured in the materials and with the nominal diameters mentioned above.

Module B

Module B is a cylindrical curved module that may be cut at the desired angle and, for this purpose, it comprises means for determining cross-sectional sections at regular angular intervals at said chosen angle of curvature. The overall shape of module B is substantially comparable to a portion of a torus from 0 to 180°, module B being able to be formed from successive ringed elements or be formed in a single block. Module B includes, in particular, two variants B1 and B2.

Module B1

Figure 2A:
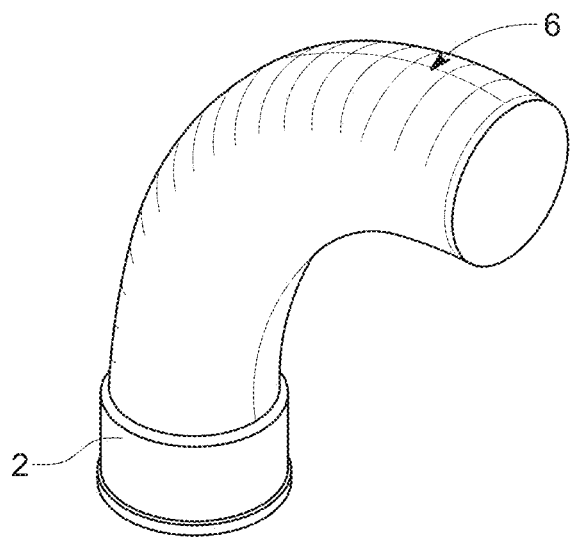
FIGS. 2A-2B represent a 3D view and a cross-sectional view B-B of the device according to the invention in an exemplary embodiment combining a curved module B1 and a module A with a female end piece.
Figure 2B:
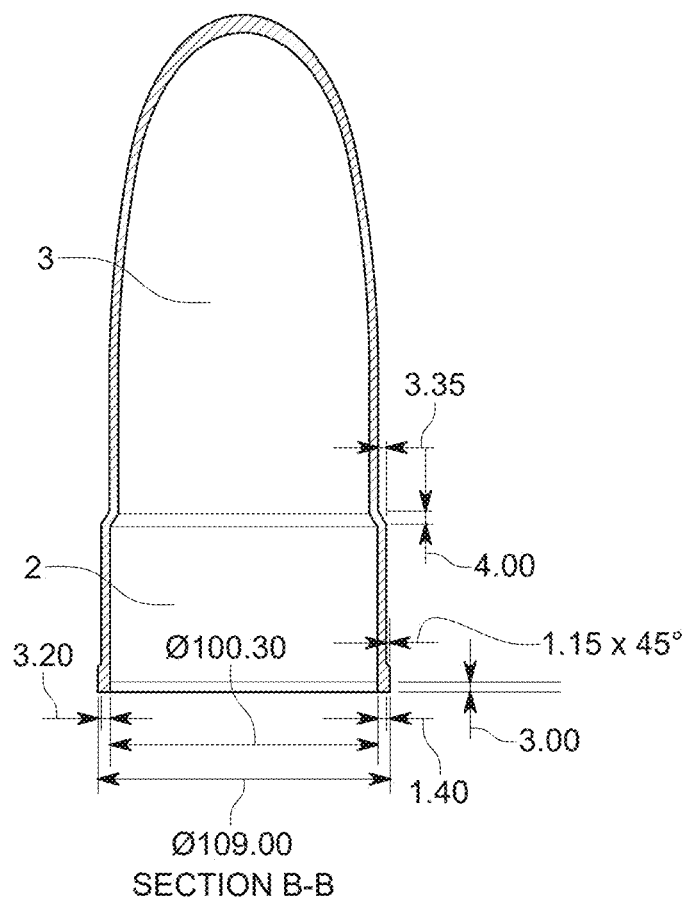

Module B1 (3), shown in FIGS. 1 and 2A-B, begins with a male or female end piece (1) and may be connected by screwing, gluing, heating, interlocking or any other method to the sleeve (2) of module A, or directly to any other pipe or hose element. As an extension of the end piece, module B1 is curved progressively from 0 to 180°, preferably from 0 to 90°.

The degree indications, labeled (4), are graduated on Module B1 in the form of rectilinear lines or graduations (5), at regular degree intervals, for example, and preferably, every 5°, allowing the cutting angle to be visualized so that the module can be cut at the desired angle. An alignment indicator (6), for example in the form of a line visible in FIG. 2A, may appear over the entire length of the module, cutting perpendicularly each of the rectilinear lines of the graduations, thus making it possible to visualize a cutting angle. This alignment indicator is intended to allow module B1 to connect to any other module, to module C, as well as to module A, by interlocking with one or the other, without creating a sealing gap in the network considered.

Preferably, the angular interval between the graduations is between 1 and 20°, preferably between 5 and 10° terminals inclusive, in order to allow sufficient adaptability to the connection constraints. Said module B1 may be manufactured in the materials and with the nominal diameters mentioned above.

Module B2

Figure 3:
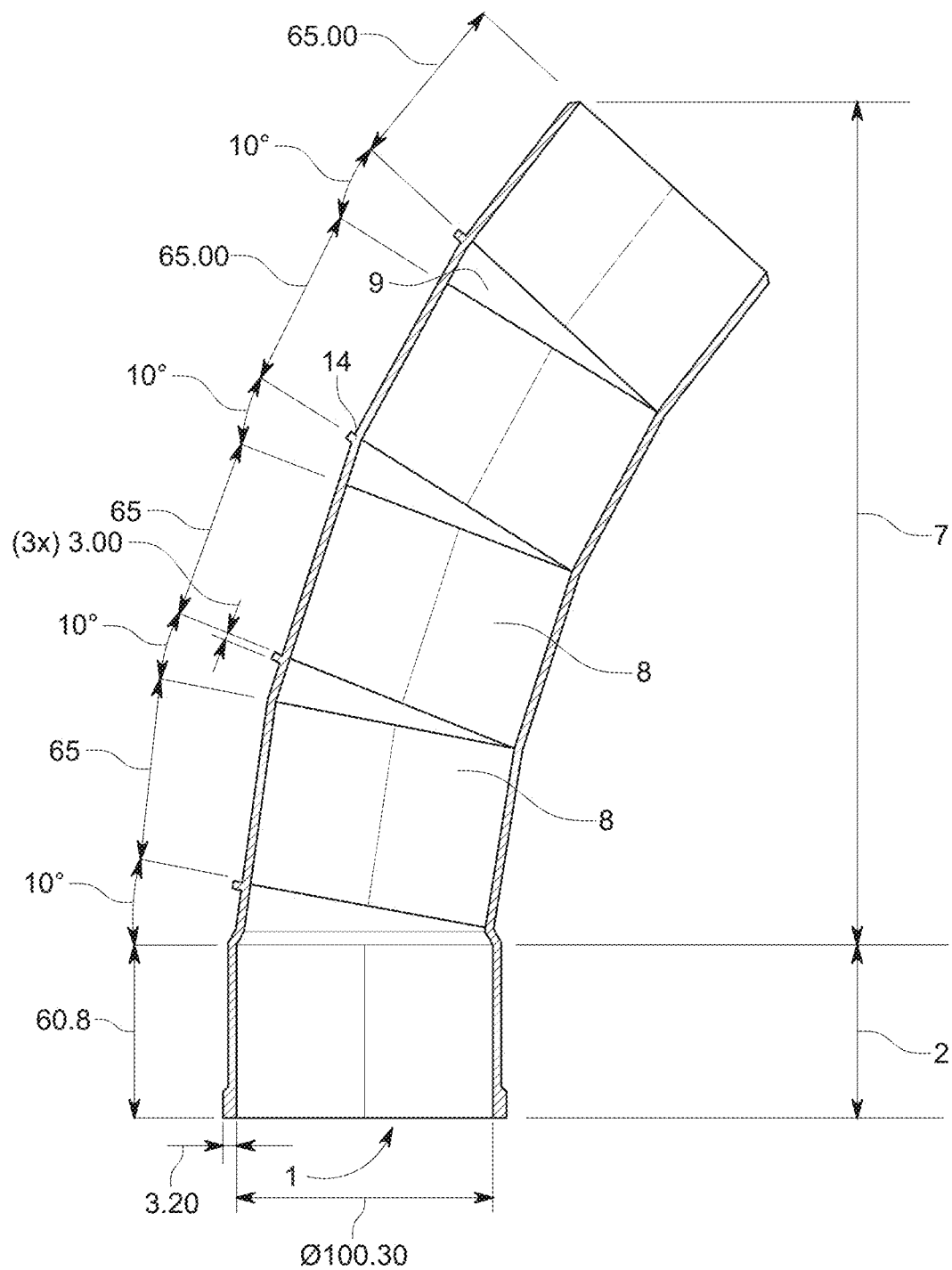
FIG. 3 represents a longitudinal sectional view A-A of the device according to the invention in an exemplary embodiment combining a curved module B2 and a module A with a female end piece.
Figure 5:
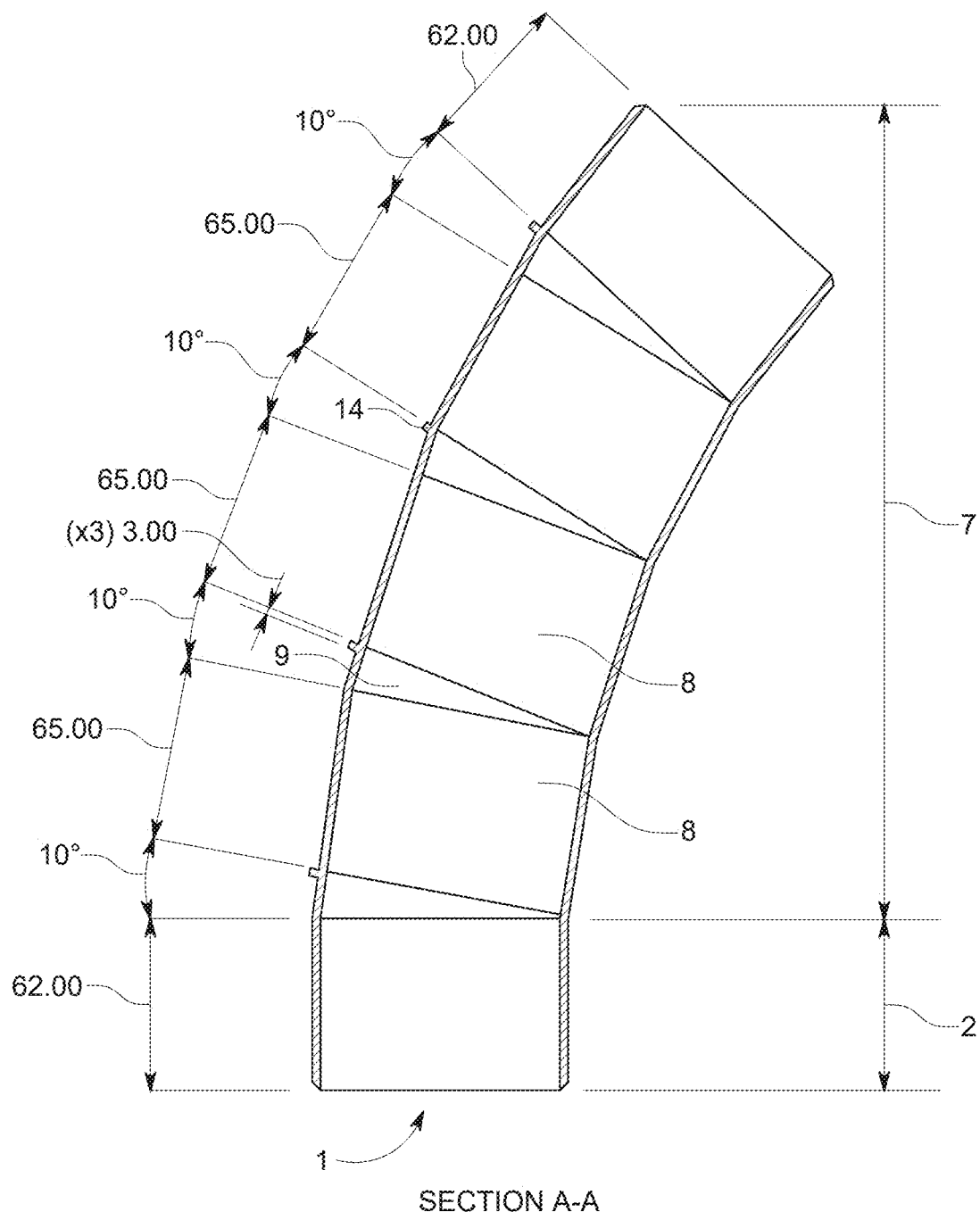
FIG. 5 represents a longitudinal sectional view A-A of the device according to the invention in an exemplary embodiment combining a curved module B2 and a module A with a male end piece.

Module B2 (7), shown in FIGS. 3 and 5, begins with a male (FIG. 5) or female (FIG. 3) end piece. It may be connected by screwing, gluing, heating, interlocking or any other method to the sleeve (2) of module A, or directly to any other pipe or hose element, etc. As an extension of the end piece, module B2 comprises a progressive curvature, which may range from 0 to 180°, preferably from 0 to 90°.

Module B2 is composed of corrugated cylindrical elements (8) (or cylindrical rings), advantageously of substantially identical width, said successive cylindrical rings being spaced in pairs by corrugated connecting elements (9), whose projection in the longitudinal section plane is similar to an isosceles triangle with a substantially rectilinear base. The length of the base of each triangle, and, therefore, the angle at the apex of each isosceles triangle, makes it possible to determine an angular interval between each of the rings. For a connection ensuring complete sealing, each cylindrical corrugated element may be provided with a stop (14), at the base of each of said cylindrical corrugated elements.

Preferably, the angular interval is between 1 and 20°, preferably between 5 and 10° terminals inclusive, in order to allow sufficient adaptability to the connection constraints. The number of cylindrical rings of module B2 is advantageously greater than 2, for example 4 or more.

Figure 4A:
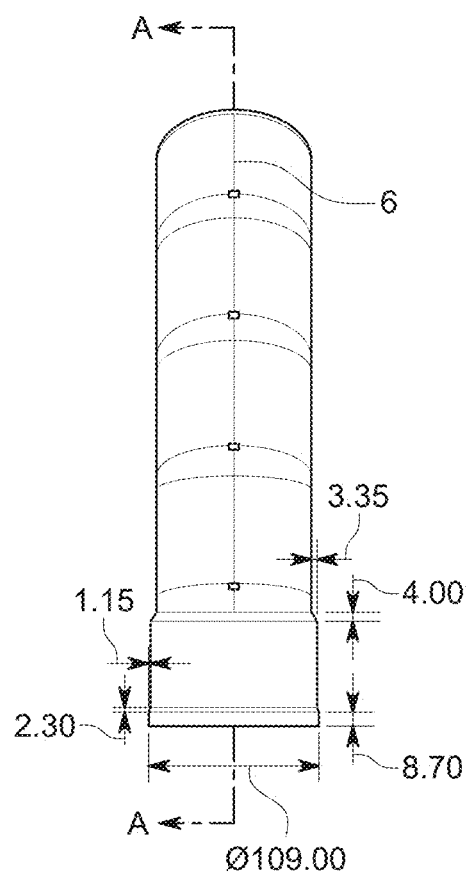
FIGS. 4A-4B represent a transverse view and a 3D view of the device according to the invention in an exemplary embodiment combining a curved module B2 and a module A with a female end piece.
Figure 4B:
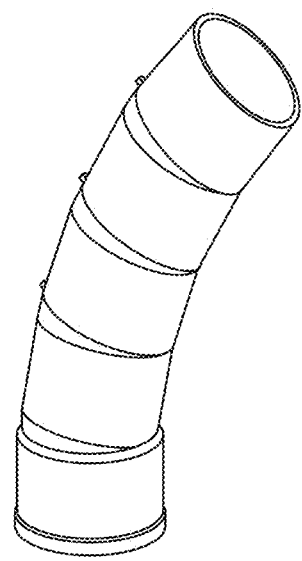
Figure 6A:
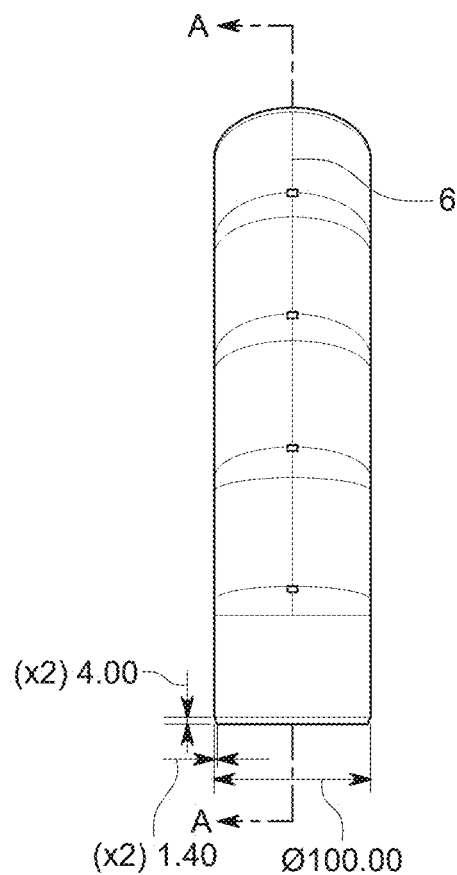
FIGS. 6A-6B represent a transverse view and a 3D view of the device according to the invention in an exemplary embodiment combining a curved module B2 and a module A with a male end piece.
Figure 6B:
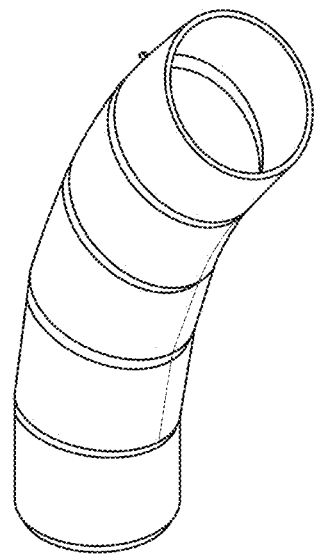

An alignment indicator (6), for example in the form of a line visible in FIGS. 4A and 6A, may appear over the entire length of the module to allow module B1 to be easily connected to any other module, to module C, as well as to module A, interlocking with one as well as the other, without creating a sealing gap in the network considered.

By its modular design, said module B2 has the additional advantage that its structure makes it possible to manufacture a module curved at an angle other than 90°. Said module B2 may also be used without module C.

Said B2 module may be available in any material, thickness, section or diameter. The interior of module B2 may be smooth or may exactly follow the geometry created by the corrugated elements.

Module C

Figure 7A:
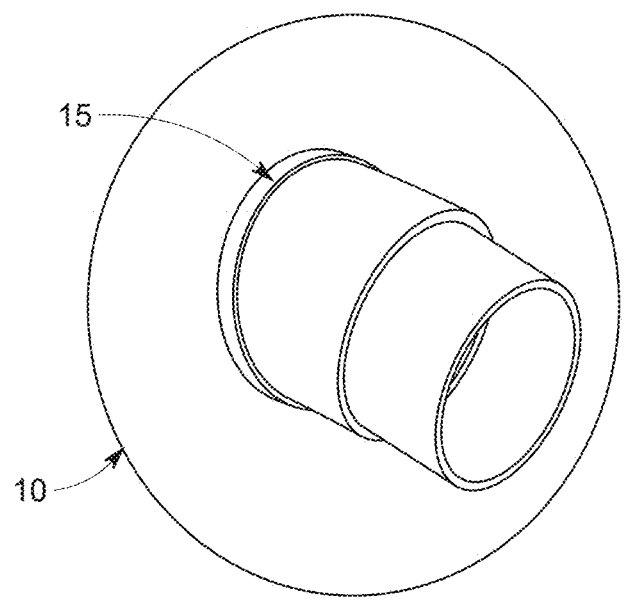
FIGS. 7A-7C represent a 3D view, a transverse view, and a longitudinal section view A-A of module C of the device according to the invention.
Figure 7B:
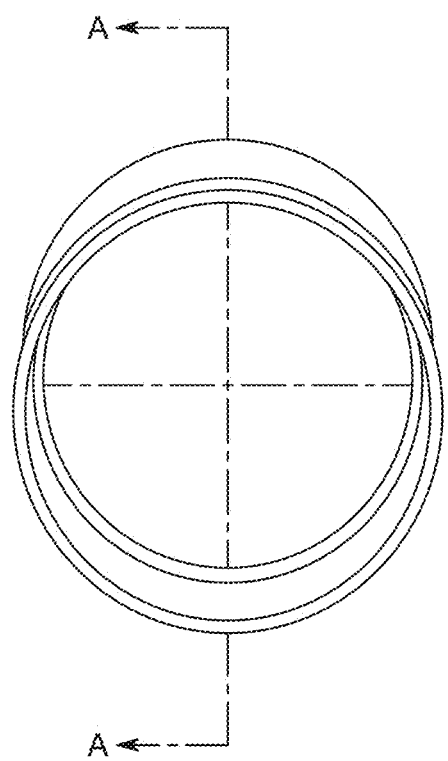
Figure 7C:
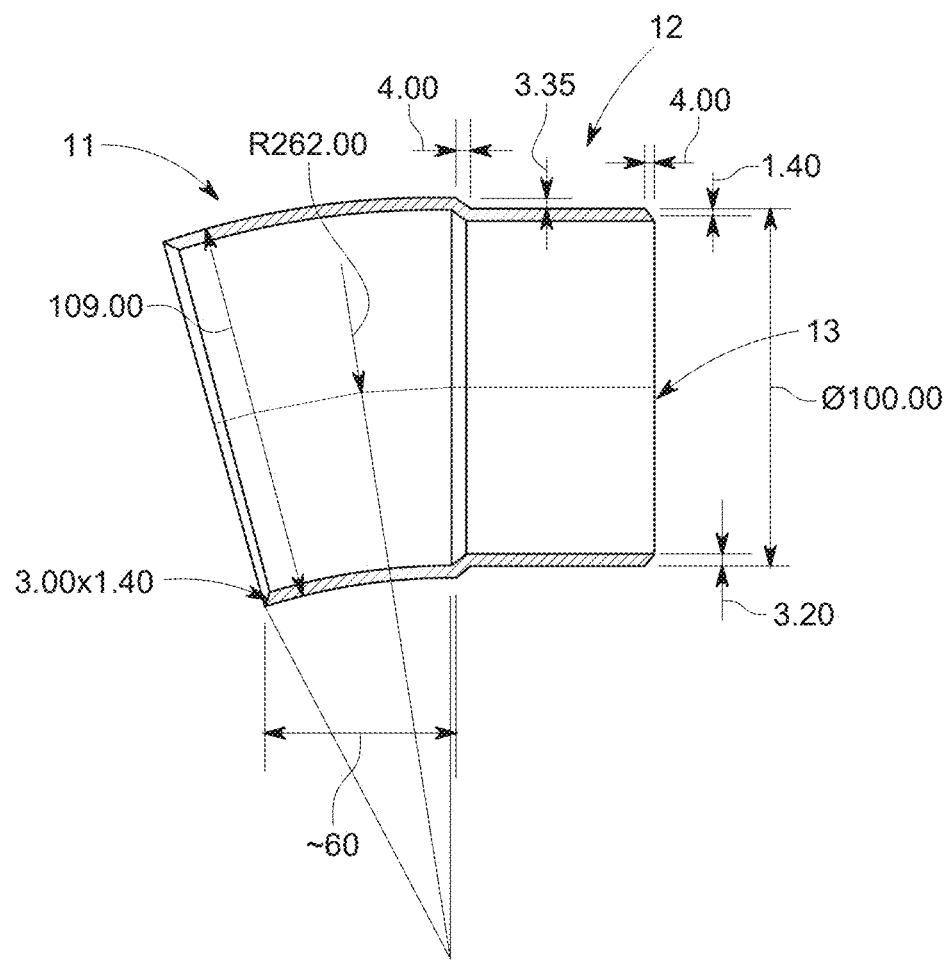

Module C (10), shown in FIGS. 7A-7C, may complement the use of module B, particularly in the embodiment with module B1.

Said module C consists of two parts:

a curved cylindrical sleeve (11) whose end piece, male or female, is adapted to the diameter of module B. This sleeve slides on module B in order to attach to it, either by screwing, gluing, heating, interlocking or any other connection method.

For a tight fit to module B, an alignment mark (15) may be embossed on the edge.

A rectilinear and fixed cylindrical sleeve (12) suitable to connect to any opening or network (pipes, joints, gutters, vents, pre-existing tubes or hoses, etc.). This sleeve has an end piece (13), male or female, allowing it to be connected to the element located where it is to be installed.

Said module C may be manufactured in the materials and with the nominal diameters mentioned above.

Use of the Device According to the Invention:

Module B1 of the connection device according to the invention is intended to be cut by any means at the desired angular gradation, in order to be able to implement a passage allowing, in particular, the transport of fluids, gases or wire-type solid material, without causing distortion, friction, heating, pinching or any other type of interruption or difficulty in said transport. These interruptions or difficulties are, indeed, a source of disasters or reduced performance (in particular, hot spots, fires, bottlenecks, unsolicited reduction in supply flow).

Module B2 of the connection device according to the invention is intended to be cut only between the cylindrical rings by any means. The angular cutting gradation is predetermined by the geometry of module B2. The cutting is carried out flush with the corrugated connecting elements, at the junction with the cylindrical rings. This makes it possible to obtain the desired angle in order to be able to implement a passage allowing in particular the transport of fluids, gases or wire-type solid material, without causing distortion, friction, heating, pinching or any other type interruptions or difficulties in said transport. These interruptions or difficulties are, indeed, a source of disasters or reduced performance (in particular, hot spots, fires, bottlenecks, unsolicited reduction in supply flow).

The end pieces of module B2 allow it to be directly connected to any opening or network (pipes, joints, gutters, vents, or pre-existing tubes or hoses, etc.) without necessarily using module C.

In all its variants, the multi-angle elbow according to the invention may be assembled to the elements to be connected (pipes, ducts, etc.) by gluing, tightening, interlocking or any other means making it possible to ensure good fitting and good sealing. In the case of tightening, the device according to the invention may be provided with one or more seals mounted on rings or not, housed in one or more grooves.

The connection device according to the invention may be manufactured in different thicknesses to comply with the different rigidity classes and standards, as well as to ensure compatibility between the different rigidity classes of the tubes and fittings.

It would not be outside the scope of the invention to use one or more modules B comprising different angular intervals per curve portion, in order to allow optimized adjustment to the connection constraints.

EXAMPLES

Example 1

A non-limiting exemplary embodiment of a connection device according to the invention, for a PVC pipe with a nominal diameter of 100 mm, in variant B1, is described below, with reference to FIGS. 1 and 2.

In this example, the multi-angle elbow comprises three hollow modules A, B1 and C with a thickness of 3.20 mm, as follows:

Module B1 begins with a female end piece of rectilinear cylindrical shape (1). The end piece of the additional sleeve A (2) allows the module to be connected directly to a pipe.

As an extension of the end piece, the diameter of the tube gets smaller to become male, corresponding to the nominal diameter of the pipe (100 mm). This male part extends forming a curve from 0 to 90°, with a radius of curvature of 262 mm. Therefore, the first module B1 may be cut anywhere on the graduated curved male part (3). The markers are drawn on or inlaid in the mass: the degrees (4) with an angular interval of 5°, the cutting markers (5) at right angle, the marker (6) for the correct alignment for assembly with module C which may also be provided with a marker (15).

Module C described in FIGS. 7A-7C begins with a female end piece, in the form of a curved sleeve (11), advantageously having the same radius of curvature as module B1, capable of sliding on the curved male part of module B1.

As an extension of the curved end piece (11), the diameter of the tube gets smaller to become male, then the tube extends into a rectilinear male cylinder (12) whose end is chamfered or not, thus being able to receive a new pre-sleeved tube in a first embodiment, or not pre-sleeved in a second embodiment.

Example 2

A non-limiting exemplary embodiment of a connection device according to the invention, for a PVC pipe with a nominal diameter of 100 mm, in variant B2, is described below (FIG. 3).

In this example, the multi-angle elbow comprises two hollow modules A and B2 with a thickness of 3.20 mm, as follows:

Module B2 (7) begins with a female end piece (1) of rectilinear cylindrical shape, 62 mm wide. The end piece of the sleeve (2) allows the module to be connected directly to a pipe.

As an extension of the end piece, the diameter of the tube gets smaller to become male, corresponding to the nominal diameter of the pipe (100 mm). This male part (7), formed of alternating cylindrical rings (8), separated by ringed connecting elements (9) creating cutting sections, forms a curve beginning with a ringed connecting element, determining an angular interval of 100 with the end piece (1), a first 65 mm-wide cylindrical ring, then a second ringed connecting element determining the same angular interval of 10°, a second 65 mm-wide cylindrical ring, a third ringed connecting element determining the same angular interval of 10°, a third 65 mm-wide cylindrical ring, a fourth ringed connecting element determining the same angular interval of 10°, then a fourth and final 65 mm-wide cylindrical ring.

Each cylindrical ring is fitted with a 3 mm stop (14).

The multi-angle elbow in this example is manufactured to form an angle less than 90° and may be cut, if necessary, flush with each cylindrical ring to form an even lower angle, at the user's choice.

The invention claimed is:

1. A rigid connection device for the transport of fluids or solid wire material comprising at least one male or female end piece and a substantially cylindrical module B2 curved up to 180° and having a first length, wherein said module B2 may be cut to a second length, less than the first length, at a chosen angle of curvature and in that said module B2 comprises alternating cylindrical rings of equal length separated in pairs by identical ringed connecting elements whose projection in the longitudinal plane is an isosceles triangle having a base at a radially outermost point of module B2, legs adjacent different ones of said alternating cylindrical rings, and an apex at a radially innermost point of module B2, and outer edges of said identical ringed connecting elements defining cross-sectional sections at regular angular intervals to said chosen angle of curvature to assist cutting of module B2 to the second length.

2. The rigid connection device according to claim 1, wherein module B2 is supplemented by a module C comprising a first curved cylindrical sleeve whose end piece, male or female, is capable of sliding on module B2 to be fixed thereon by at least one of screwing, gluing, heating, interlocking and any other connection method, and a second cylindrical and fixed sleeve capable of connecting to an opening or a network by means of an end piece, male or female.

3. The rigid connection device according to claim 2, wherein said module C comprises an alignment indicator.

4. The rigid connection device according to claim 1, comprising a module A comprising a sleeve, equipped with a male or female end piece, capable of connecting to module B2 on one side and to at least one of an opening and any network on the other.

5. The rigid connection device according to claim 1, formed from at least one of the following materials: polyvinyl chloride, polypropylene, polyethylene, polyvinylidene fluoride, polyolefin, fiber, fiber cement, sandstone, concrete, zinc, steel, aluminum, copper, metal alloys, and resins.

6. The rigid connection device according to claim 1, wherein a nominal outer diameter of said rigid connection device is between 10 mm and 2000 mm.

7. The rigid connection device according to claim 1 configured for the transport of gases, liquids or solid elements.

8. The rigid connection device according to claim 1, formed from at least one of the following materials: polyvinyl chloride, polypropylene, polyethylene, fiber, fiber cement, sandstone, concrete, zinc, steel, aluminum, metal alloys, and resins.

9. The rigid connection device according to claim 1, formed from polyvinyl chloride.

10. The rigid connection device according to claim 1, wherein a nominal outer diameter of said rigid connection device is between 20 mm and 1000 mm.

11. The rigid connection device according to claim 1, wherein a nominal outer diameter of said rigid connection device is between 32 mm and 630 mm.

12. The rigid connection device according to claim 1, wherein the substantially cylindrical module B2 is curved up to 90°.

13. The rigid connection device according to claim 1, wherein module B2 comprises an alignment indicator over an entire length of the module, perpendicularly cutting the outer edges of the identical ringed connecting elements.

14. The rigid connection device according to claim 1, wherein said module B2 comprises a stop at a base of each of the alternating cylindrical rings.

* * * * *